(12) United States Patent
Yao

(10) Patent No.: US 12,156,068 B2
(45) Date of Patent: Nov. 26, 2024

(54) CELL MEASUREMENT METHOD BASED ON FREQUENCY POINT OPTIMIZATION AND TERMINAL DEVICE

(71) Applicant: GUANGDONG GENIUS TECHNOLOGY CO., LTD., Dongguan (CN)

(72) Inventor: Sheng Yao, Dongguan (CN)

(73) Assignee: GUANGDONG GENIUS TECHNOLOGY CO., LTD., Dongguan (CN)

( * ) Notice: Subject to any disclaimer, the term of this patent is extended or adjusted under 35 U.S.C. 154(b) by 122 days.

(21) Appl. No.: 17/989,027

(22) Filed: Nov. 17, 2022

(65) Prior Publication Data

US 2023/0071664 A1 Mar. 9, 2023

Related U.S. Application Data

(63) Continuation of application No. PCT/CN2020/140739, filed on Dec. 29, 2020.

(30) Foreign Application Priority Data

May 19, 2020 (CN) .......................... 202010423765.1

(51) Int. Cl.
| | | |
|---|---|---|
| *H04W 24/10* | (2009.01) | |
| *H04B 17/309* | (2015.01) | |
| *H04W 72/0453* | (2023.01) | |

(52) U.S. Cl.
CPC .......... *H04W 24/10* (2013.01); *H04B 17/309* (2015.01); *H04W 72/0453* (2013.01)

(58) Field of Classification Search
CPC . H04W 24/10; H04W 72/0453; H04W 48/16; H04W 52/0212; H04W 24/08;

(Continued)

(56) References Cited

U.S. PATENT DOCUMENTS 7,062,271 B2 6/2006 Choi
8,903,383 B2 * 12/2014 Farnsworth .......... H04W 60/04
455/434

(Continued)

FOREIGN PATENT DOCUMENTS

CN 102170671 A 8/2011
CN 107995648 A 5/2018

(Continued)

OTHER PUBLICATIONS

CATT, R4-1913739 Further discussion on RRM measurement relaxation for NR power saving, 3GPP TSG-RAN4 Meeting #93, dated Nov. 22, 2019.

(Continued)

*Primary Examiner* — Brian T O Connor
(74) *Attorney, Agent, or Firm* — Westbridge IP LLC

(57) ABSTRACT

Disclosed is a cell measurement method based on frequency point optimization. The method includes: when a cell measurement condition is satisfied, if a current serving cell of a terminal device matches a serving cell in a stored measurement record, measuring cell information of a frequency point corresponding to the highest measurement priority in the measurement record. When the cell measurement condition is satisfied and the current serving cell of the terminal device does not match a serving cell in the measurement record, if the current serving cell is a cell corresponding to the frequency point corresponding to the highest measurement priority in the measurement record, measuring cell information of the frequency point corresponding to the highest measurement priority in the measurement record.

8 Claims, 4 Drawing Sheets

(58) Field of Classification Search
CPC ... H04W 24/02; H04B 17/309; H04B 17/318; H04B 17/336; Y02D 30/70

See application file for complete search history.

(56) References Cited

U.S. PATENT DOCUMENTS

| | | | |
|---|---|---|---|
| 9,474,000 B2* | 10/2016 | Kilpatrick, II | H04W 36/0085 |
| 11,516,691 B2* | 11/2022 | Li | H04W 48/12 |
| 11,706,646 B2* | 7/2023 | Kim | H04L 5/0053 370/252 |
| 11,716,660 B2* | 8/2023 | Jung | H04W 36/32 370/331 |
| 11,924,806 B2* | 3/2024 | Huang | H04J 11/0076 |
| 11,937,111 B2* | 3/2024 | Kimba Dit Adamou | H04L 1/0026 |
| 2013/0225169 A1 | 8/2013 | Farnsworth et al. | |
| 2015/0038140 A1 | 2/2015 | Kilpatrick, II et al. | |
| 2018/0368034 A1 | 12/2018 | Lin et al. | |
| 2021/0204158 A1 | 7/2021 | Kimba Dit Adamou et al. | |
| 2021/0235344 A1* | 7/2021 | Jung | H04W 36/0094 |
| 2021/0314959 A1* | 10/2021 | Islam | H04W 36/0088 |
| 2023/0071664 A1 | 3/2023 | Yao | |
| 2024/0031894 A1* | 1/2024 | Jung | H04W 72/542 |

FOREIGN PATENT DOCUMENTS

| | | |
|---|---|---|
| CN | 109391958 A | 2/2019 |
| CN | 109803278 A | 5/2019 |
| CN | 110831129 A | 2/2020 |
| CN | 110944351 A | 3/2020 |
| CN | 111050365 A | 4/2020 |
| EP | 2779745 A1 | 9/2014 |
| EP | 4156752 A1 | 3/2023 |
| WO | 2016090770 A1 | 6/2016 |
| WO | 2018126824 A1 | 7/2018 |
| WO | 2019029369 A1 | 2/2019 |
| WO | 2020057418 A1 | 3/2020 |

OTHER PUBLICATIONS

First Office Action issued in counterpart Chinese Patent Application No. 202010423765.1, dated Sep. 26, 2022.

Huawei et al., R2-1915530 Reducing the number of neighbour cells/carriers to measure, 3GPP tsg_ran\wg2_rl2, tsgr2_108, dated Nov. 8, 2019.

International Search Report and Written Opinion issued in corresponding PCT Application No. PCT/CN2020/140739, dated Mar. 25, 2021.

LG Electronics, R2-2001402 Per-frequency measurement relaxation based on neighbour cell quality, 3GPP tsg_ran\wg2_rl2, tsgr2_109_e, dated Feb. 14, 2020.

LG Electronics, R4-2006695 Performance Impact on measurement relaxation for power saving, 3GPP tsg_ran\wg4_radio, tsgr4_95_e, dated May 15, 2020.

Oppo, R2-1905594 Higher priority frequency searching relaxes for UE power saving, 3GPP tsg_ran\wg2_rl2, tsgr2_106, dated Apr. 30, 2019.

Second Office Action issued in counterpart Chinese Patent Application No. 202010423765.1, dated May 24, 2023.

Sony, R2-2000827 UE power saving for inter frequency measurements, 3GPP tsg_ran\wg2_rl2, tsgr2_109_e, dated Feb. 14, 2020.

Third Office Action issued in counterpart Chinese Patent Application No. 202010423765.1, dated Nov. 30, 2023.

Examination Report issued in counterpart Singapore Patent Application 11202260391Y, dated Jul. 12, 2024.

Extended European Search Report issued in counterpart Europe Patent Application No. 20936901.6, dated May 29, 2024.

Notice for Eligibility of Grant issued in counterpart Singapore Patent Application 11202260391Y, dated Jul. 12, 2024.

Search Report issued in counterpart Singapore Patent Application 11202260391Y, dated Jul. 12, 2024.

* cited by examiner

CELL MEASUREMENT METHOD BASED ON FREQUENCY POINT OPTIMIZATION AND TERMINAL DEVICE

CROSS-REFERENCE TO RELATED APPLICATIONS

This application is a continuation of International Application No. PCT/CN2020/140739, filed on Dec. 29, 2020, which claims priority to Chinese Patent Application No. 202010423765.1, filed on May 19, 2020, all contents of which are incorporated herein by reference.

TECHNICAL FIELD

The present application relates to the technical field of communications, specifically to a cell measurement method based on frequency point optimization and a terminal device.

BACKGROUND

In a moving process, in order to satisfy the continuity of a communication service of a terminal device or in order to maintain an access to a cell with higher signal strength, the terminal device needs to measure adjacent cell information at a certain interval. The measurement of a frequency point in an adjacent cell depends on measurement configuration information sent by a network device, that is, the terminal device needs to measure cell information under a frequency point indicated by the measurement configuration information.

In a cell network deployment scenario as shown in FIG. 1, cell1, cell2, cell3, and cell4 are included. A serving cell of the terminal device (UE1) is cell 1, and the frequency point is f1. The frequency point corresponding to cell2 is f2. The frequency point corresponding to cell3 is f3. The frequency point corresponding to cell4 is f4. UE2 resides in an overlapping area of cell2 and cell3. If the measurement configuration information received by UE1 and sent by the network device indicates that frequency points to be measured are f2, f3, and f4, that is, UE1 is required to measure cell information under f1, f2, f3 and f4. However, according to the network deployment in FIG. 1, UE1 only needs to measure frequency points f1 and f2. The measurement of frequency points f3 and f4 is meaningless, resulting in waste of power consumption of UE1 and affecting the performance of the terminal device.

SUMMARY

An embodiment of the present application discloses a cell measurement method based on frequency point optimization and a terminal device, which is used to shorten the measurement time, reduce the power consumption of the terminal device, and improve the system performance.

In view of this, the first aspect of an embodiment of the present application discloses a cell measurement method based on frequency point optimization, and the method may include:
  when a cell measurement condition is satisfied, if a current serving cell of a terminal device matches a serving cell in a stored measurement record, measuring cell information of a frequency point corresponding to the highest measurement priority in the measurement record, wherein the measurement record comprises serving cells of the terminal device, and frequency points respectively corresponding to multiple measurement priorities set according to the signal strength, and the cell measurement condition comprises receiving measurement configuration information sent by a network device or detecting that a measurement cycle is satisfied;
  when the cell measurement condition is satisfied and the current serving cell of the terminal device does not match a serving cell in the measurement record, if the current serving cell of the terminal device is a cell corresponding to the frequency point corresponding to the highest measurement priority in the measurement record, measuring cell information of the frequency point corresponding to the highest measurement priority in the measurement record; and
  when the cell measurement condition is satisfied and the current serving cell of the terminal device does not match a serving cell in the measurement record, if the current serving cell of the terminal device is a cell corresponding to a specific frequency point, measuring cell information under a frequency point corresponding to a measurement priority to which the specific frequency point belongs, wherein the specific frequency point is a frequency point corresponding to a target measurement priority in the measurement record, and the target measurement priority is not the highest measurement priority in the measurement record.

Optionally, in one embodiment of the present application, the method includes:
  if the measurement configuration information sent by the network device is received, but the measurement record is not detected, measuring cell information under a frequency point indicated by the measurement configuration information to obtain a measurement result which indicates the signal strength corresponding to each frequency point, so as to perform, according to the measurement result, measurement priority division on the frequency points comprised in the measurement configuration information to obtain the frequency points corresponding to the various measurement priorities, and obtain and store a measurement record according to the frequency points corresponding to the various measurement priorities and the serving cells of the terminal device.

Optionally, in one embodiment of the present application, the method includes:
  when the cell measurement condition is receiving the measurement configuration information sent by the network device, if the current serving cell of the terminal device does not match a serving cell in the measurement record, and the current serving cell of the terminal device is not a cell corresponding to the frequency point corresponding to any measurement priority in the measurement record, executing the step of measuring cell information under a frequency point indicated by the measurement configuration information to obtain a measurement result.

Optionally, on one embodiment of the present application, after the measuring cell information under a frequency point indicated by the measurement configuration information to obtain a measurement result, the method further comprises:
  sending a measurement report message carrying the measurement result to the network device.

Optionally, in one embodiment of the present application, the signal strength comprises at least one of the following: Reference Signal Receiving Power (RSRP), Reference Signal Receiving Quality (RSRQ), Signal to Interference plus Noise Ratio (SINR), and Received Signal Strength Indicator (RSSI).

The second aspect of an embodiment of the present application discloses a terminal device, and the terminal device may includes a processing module, wherein when a cell measurement condition is satisfied, if a current serving cell of the terminal device matches a serving cell in a stored measurement record, the processing module measures cell information of a frequency point corresponding to the highest measurement priority in the measurement record, wherein the measurement record comprises serving cells of the terminal device, and frequency points respectively corresponding to multiple measurement priorities set according to the signal strength, and the cell measurement condition comprises receiving measurement configuration information sent by a network device or detecting that a measurement cycle is satisfied; when the cell measurement condition is satisfied and the current serving cell of the terminal device does not match a serving cell in the measurement record, if the current serving cell of the terminal device is a cell corresponding to the frequency point corresponding to the highest measurement priority in the measurement record, the processing module measures cell information of the frequency point corresponding to the highest measurement priority in the measurement record; when the cell measurement condition is satisfied and the current serving cell of the terminal device does not match a serving cell in the measurement record, if the current serving cell of the terminal device is a cell corresponding to a specific frequency point, the processing module measures cell information under a frequency point corresponding to a measurement priority to which the specific frequency point belongs, wherein the specific frequency point is a frequency point corresponding to a target measurement priority in the measurement record, and the target measurement priority is not the highest measurement priority in the measurement record.

Optionally, in one embodiment of the present application, the processing module is further configured to: if the measurement configuration information sent by the network device is received, but the measurement record is not detected, measure cell information under a frequency point indicated by the measurement configuration information to obtain a measurement result which indicates the signal strength corresponding to each frequency point, so as to perform, according to the measurement result, measurement priority division on the frequency points comprised in the measurement configuration information to obtain the frequency points corresponding to the various measurement priorities, and obtain and store a measurement record according to the frequency points corresponding to the various measurement priorities and the serving cells of the terminal device.

Optionally, in one embodiment of the present application, when the cell measurement condition is receiving the measurement configuration information sent by the network device, if the current serving cell of the terminal device does not match a serving cell in the measurement record, and the current serving cell of the terminal device is not a cell corresponding to the frequency point corresponding to any measurement priority in the measurement record, the processing module is triggered to execute the step of measuring cell information under a frequency point indicated by the measurement configuration information to obtain a measurement result.

The third aspect of an embodiment of the present application discloses a terminal device, and the terminal device may includes:
a memory which stores executable program codes; and
a processor is coupled to the memory,
wherein the processor invokes the executable program codes stored in the memory to implement the cell measurement method based on frequency point optimization according to the method of the first aspect of the embodiment of the present application.

The third aspect of an embodiment of the present application discloses a computer-readable storage medium including instructions which, when run on a computer, causes the computer to implement the method according to the method of the first aspect of the embodiment of the present application.

The fourth aspect of an embodiment of the present application discloses a computer-readable storage medium storing a computer program, wherein the computer program causes a computer to implement the method according to the method of the first aspect of the embodiment of the present application.

The fifth aspect of an embodiment of the present application discloses a computer program product, when the computer program product is run on the computer, causes a computer to implement the method according to the method of the first aspect of the embodiment of the present application.

The sixth aspect of an embodiment of the present application discloses an application publishing platform, the application publishing platform for publishing computer program product, when the computer program product is run on the computer, causes a computer to implement the method according to the method of the first aspect of the embodiment of the present application.

Compared with the prior art, the embodiment of the present application has the following beneficial effects:

During implementation of the above embodiment, by means of storing the measurement record of the previous cell measurement, the measurement record includes the serving cells of the terminal device, the frequency points corresponding to the multiple priorities set according to the signal strength, and the correspondence relationships between the frequency points and the cells. Later, when the cell measurement condition (the measurement configuration information sent by the network device is received or it is detected that the measurement cycle is satisfied) is satisfied, if the current serving cell of the terminal device matches a serving cell in the stored measurement record, only the cell information of the frequency point with the highest measurement priority in the measurement record needs to be measured, and the cell information under the frequency points corresponding to other priorities is not required to be measured. When the cell measurement condition (the measurement configuration information sent by the network device is received or it is detected that the measurement cycle is satisfied) is satisfied and the current serving cell of the terminal device does not match a serving cell in the measurement record, if the current serving cell of the terminal device is a cell corresponding to the frequency point corresponding to the highest measurement priority in the measurement record, only the cell information of the frequency point with the highest measurement priority in the measurement record needs to be measured similarly, and the cell information under the frequency points corresponding to other priorities is not required to be measured. However, if the current serving cell of the terminal device is a cell corresponding to a specific frequency point, only the cell information under the frequency point corresponding to the measurement priority to which the specific frequency point belongs is measured. The specific frequency point is the frequency point corresponding to the target measurement priority in the measurement record, and the target measurement priority is not the highest measurement priority in the measurement record. It can be seen that according to changes of serving cells, the terminal device can optimize the cell measurement, decrease the number of measurement frequency points, shorten the measurement time, reduce the power consumption of the terminal device, and improve the system performance. Furthermore, since the measurement frequency points can be intelligently selected according to the changes of the serving cells, the present application comprehensively considers moving scenario of the terminal device and is applicable to mobility management of protocols.

BRIEF DESCRIPTION OF THE DRAWINGS

In order to more clearly explain the technical solutions in the embodiments of the present application, the following will briefly introduce the drawings required in the embodiments or exemplary technical descriptions. Obviously, the drawings in the following description are only for the application. In some embodiments, for those of ordinary skill in the art, without paying any creative labor, other drawings may be obtained based on these drawings.

DETAILED DESCRIPTION OF THE EMBODIMENTS

Hereinafter, the technical solution in the embodiments of the present application will be clearly and completely described in connection with the attached drawings in the embodiments of the present application. Based on the embodiments of the present application, all other embodiments obtained by those skilled in the art without any creative labour, belonging to the protection range of the present application.

It should be noted that the term "comprising" and "having" and any deformation of them are intended to cover the inclusion of a series of steps or units, including, for example, a series of steps or units, methods, systems, and other methods. The products or devices need not be limited to those steps or units clearly listed, but may include other steps or units that are not expressly listed or for these processes, methods, products or devices.

Figure 2:
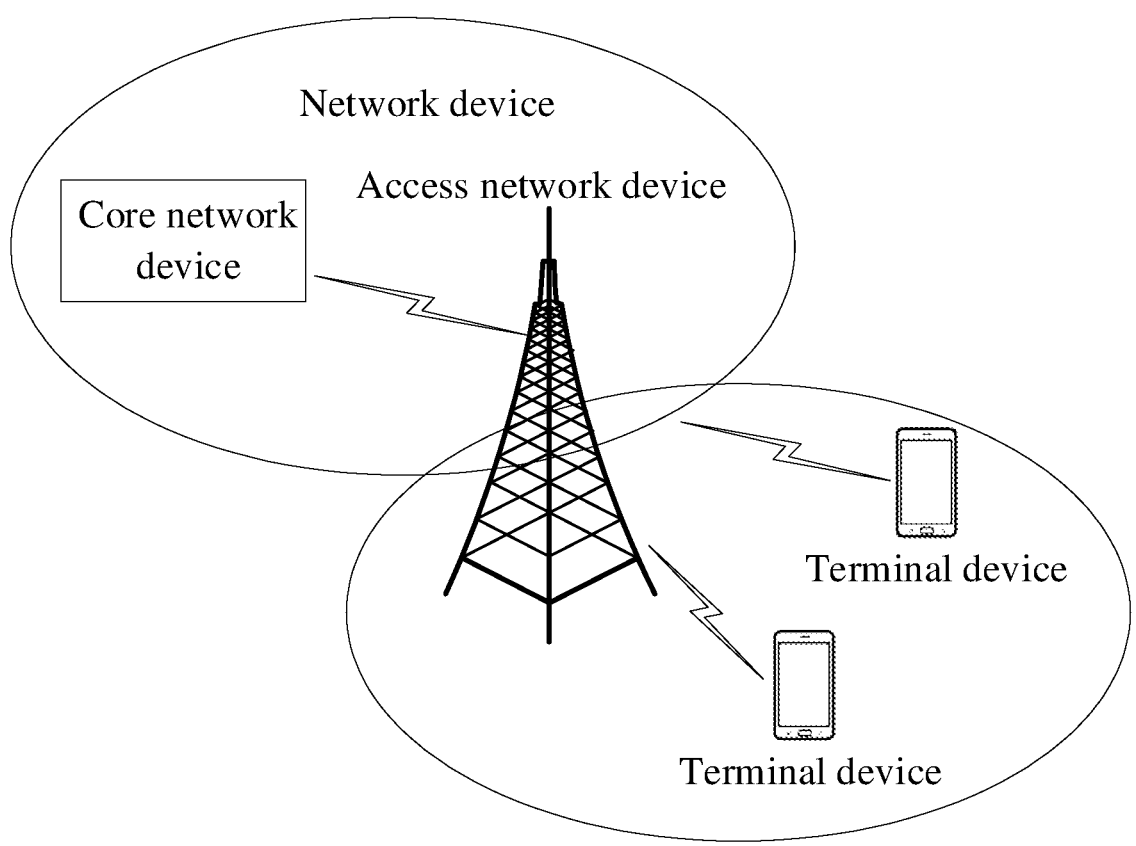
FIG. 2 is a system architecture diagram where an embodiment of the present application is applied.

As shown in FIG. 2, a system architecture diagram where an embodiment of the present application is applied is illustrated. The system architecture may include a network device and a terminal device. A network device may include an access network device and a core network device. That is, a wireless communication system further includes a plurality of core networks communicating with an access network device. The access network device can be an evolutional node B (eNB or e-NodeB), a macro NodeB, a micro NodeB (or referred to as "small NodeB"), a femto base station, an access point (AP), a transmission point (TP) or a new generation Node B (gNodeB) in a long-term evolution (LTE) system, a next radio (mobile communication system) (NR) system or an authorized auxiliary access long-term evolution (LAA-LTE) system.

The terminal device in an embodiment of the present application can be referred to as user equipment (UE). The terminal device can be a personal communication service (PCS) telephone, a cordless telephone, a session initiation protocol (SIP) telephone, a wireless local loop (WLL) station, a personal digital assistant (PDA) and other devices. The terminal device can also be a mobile phone, a mobile station (MS), a mobile terminal, a notebook computer, and the like. The terminal device can communicate with one or more core networks via a radio access network (RAN). For example, the terminal device can be a mobile phone (or a "cell" phone) or a computer with a mobile terminal or the like. For example, the terminal device can also be a portable, pocket, handheld, computer built-in or vehicle-mounted mobile apparatus that exchanges speech and/or data with the wireless access network. The terminal device can also be a handheld device with a wireless communication function, a computing device or other processing devices connected to a wireless modem, a vehicle-mounted device, a wearable device, a terminal device in a future 5G network, a terminal device in a future evolutional network, or the like. The above is just an example, which is not limited in practical applications.

An embodiment of the present application discloses a cell measurement method based on frequency point optimization, a terminal device and a storage medium, which, according to changes of serving cells, can optimize cell measurement, decrease the number of measurement frequency points, shorten the measurement time, reduce the power consumption of the terminal device, and improve the system performance. The method specifically includes:

when a cell measurement condition is satisfied, if a current serving cell of the terminal device matches a serving cell in a stored measurement record, measuring cell information of a frequency point corresponding to the highest measurement priority in the measurement record, wherein the measurement record includes serving cells of the terminal device, and frequency points respectively corresponding to multiple measurement priorities set according to the signal strength, and the cell measurement condition includes receiving measurement configuration information sent by a network device or detecting that a measurement cycle is satisfied;

when the cell measurement condition is satisfied and the current serving cell of the terminal device does not match a serving cell in the measurement record, if the current serving cell of the terminal device is a cell corresponding to the frequency point corresponding to the highest measurement priority in the measurement record, measuring cell information of the frequency point corresponding to the highest measurement priority in the measurement record; and when the cell measurement condition is satisfied and the current serving cell of the terminal device does not match a serving cell in the measurement record, if the current serving cell of the terminal device is a cell corresponding to a specific frequency point, measuring cell information under a frequency point corresponding to a measurement priority to which the specific frequency point belongs, wherein the specific frequency point is a frequency point corresponding to a target measurement priority in the measurement record, and the target measurement priority is not the highest measurement priority in the measurement record.

Figure 3:
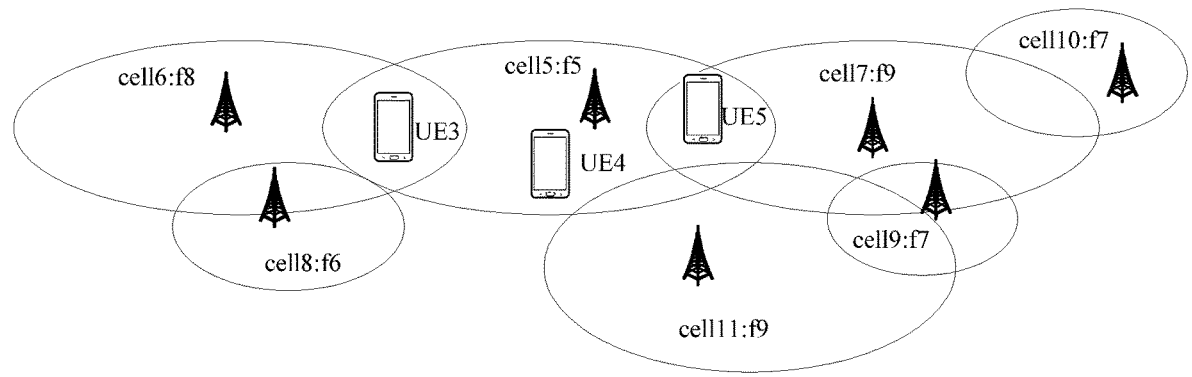
FIG. 3 is a cell network deployment scenario diagram provided according to an embodiment of the present application.

Referring to FIG. 3, FIG. 3 is a cell network deployment scenario diagram provided according to an embodiment of the present application. FIG. 3 includes seven cells, i.e., cell5, cell6, cell7, cell8, cell9, cell10, and cell11. A serving cell of a terminal device (such as UE3) is cell5, and a frequency point is f5; a frequency point corresponding to cell6 is f8; a frequency point corresponding to cell8 is f6; a frequency point of cell7 is f9; a frequency point of cell9 is f7; a frequency point of cell10 is f7; a frequency point of cell11 is f9; UE4 resides in cell5; UE5 resides in an overlap area of cell5 and cell7. UE3 receives measurement configuration information sent by a network device. The measurement configuration information indicates that frequency points to be measured are f5, f6, f7, f8, and f9, and then all the frequency points in the measurement configuration information are measured to obtain measurement results. The measurement results indicate that the cell signal strengths of frequency points f5, f8 and f6 are strong. The cell signal strengths of frequency points f9 and f7 are weak. Therefore, the measurement priorities of frequency points f5, f8 and f6 can be set to 0, while the measurement priorities of frequency points f9 and f7 can be set to 1. Further, a measurement record can be stored locally. The measurement record includes the frequency points corresponding to the various measurement priorities, correspondence relationships between the frequency points and the cells, and the serving cells of the terminal device. It should be noted that a larger value of a measurement priority indicates a lower measurement priority.

Figure 1:
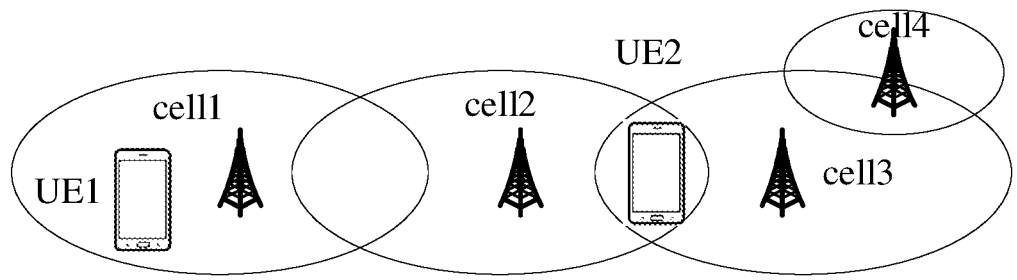
FIG. 1 is a cell network deployment scenario diagram in the prior art.

Thus, if measurement configuration information re-sent by the network device is received or a measurement cycle is satisfied, whether the current serving cell of the terminal device has changed can be first detected, that is, whether the current serving cell of the terminal device matches a serving cell in the measurement record is detected. If the current serving cell matches a serving cell, it indicates that there is no change, which also indicates that the position of the terminal device has not changed or has not changed much. The cell information corresponding to the frequency points with the measurement priority of 0 is measured only, and the cell information corresponding to the frequency point with measurement priority of 1 is not required to be measured (because these cells are far away from the terminal device). If the current serving cell does not match a serving cell, it indicates that there is a change. Whether the current serving cell of the terminal device is a cell corresponding to a frequency point with the measurement priority of 0. If yes, the cell information corresponding to the frequency point with the measurement priority of 0 is measured only. If not, whether the current serving cell of the terminal device is a cell corresponding to a frequency point with the measurement priority of 1 is further detected. If yes, it can indicate that the terminal device has moved near to these cells. The cell information corresponding to the frequency points with the measurement priority of 1 is measured only, and the cell information corresponding to the frequency point with measurement priority of 0 is not required to be measured. It can be seen that when the technical solution of the present application is applied to the application scenario shown in FIG. 3 or other application scenarios optimized or transformed on the application scenario shown in FIG. 1, the measurement priorities of the frequency points can be divided according to the signal strength, so as to optimize the measurement frequency points and decrease the number of measurement frequency points, thus shortening the measurement time, saving the power of terminal device, and reducing the power consumption.

Of course, if the current serving cell of the terminal device neither belongs to the cells corresponding to frequency points with the measurement priorities of 0 nor belongs the cells corresponding to the frequency points with the measurement priorities of 1, it indicates that the terminal device has moved to other places and is far away from these cells, so that it is necessary to carry out measurement again according to the measurement configuration information.

It should be noted that the above measurement cycle can be set by the terminal device or specified by the network device. Optionally, if the measurement cycle is set by the terminal device, the measurement cycle can be set after the measurement configuration information sent by the network device is received for the first time.

The technical solution of the present application will be described exemplarily below in combination with specific embodiments.

Figure 4:
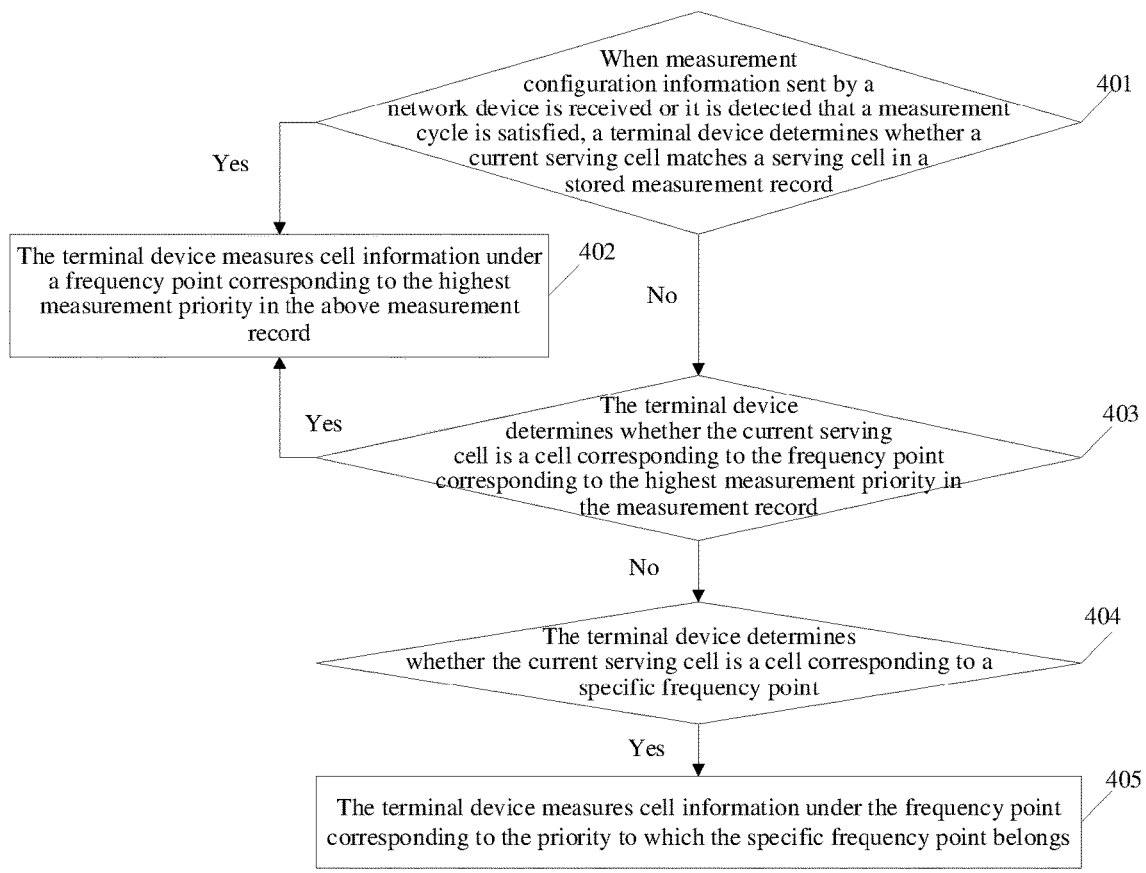
FIG. 4 is a schematic diagram of an embodiment of a cell measurement method based on frequency point optimization of the present application.

As shown in FIG. 4, a schematic diagram of an embodiment of a cell measurement method based on frequency point optimization of the present application is illustrated. The cell measurement method may include:

401. When measurement configuration information sent by a network device is received or it is detected that a measurement cycle is satisfied, a terminal device determines whether a current serving cell matches a serving cell in a stored measurement record, wherein the measurement record includes serving cells of the terminal device, frequency points respectively corresponding to multiple measurement priorities set according to the signal strength, and a correspondence relationships between the frequency points and the cells.

If the current serving cell matches a serving cell in the measurement record, step 402 is executed. If the current serving cell does not match a serving cell in the measurement record, step 403 is executed.

One measurement priority corresponds to one or more frequency points. A frequency point with a higher measurement priority has higher signal strength.

Optionally, the above measurement configuration information carries the measurement information of at least one frequency point to be measured. For example, the measurement configuration information carries the measurement information of frequency points f5, f6, f7, f8 and f9, and the terminal device is instructed to measure cell information under the corresponding frequency point according to the measurement information of each frequency point.

Optionally, the above signal strength includes at least one of the following: Reference Signal Receiving Power (RSRP), Reference Signal Receiving Quality (RSRQ), Signal to Interference plus Noise Ratio (SINR), and Received Signal Strength Indicator (RSSI).

402. The terminal device measures cell information under a frequency point corresponding to the highest measurement priority in the above measurement record.

The frequency point corresponding to the highest measurement priority is a frequency point with the highest measurement priority. Exemplarily, the frequency points with the measurement priority of 0 introduced in combination with FIG. 3 are frequency points corresponding to the highest measurement priority in the measurement record, including frequency points f5, f8 and f6.

403. The terminal device determines whether the current serving cell is a cell corresponding to the frequency point corresponding to the highest measurement priority in the measurement record.

If yes, step 402 is carried out. If no, step 404 is carried out.

404. The terminal device determines whether the current serving cell is a cell corresponding to a specific frequency point. The specific frequency point is a frequency point corresponding to a target measurement priority in the above measurement record, and the target measurement priority is not the highest measurement priority in the above measurement record.

If a determination result is yes, step 405 is executed. If a determination result is no, the terminal device determines that the current serving cell is not a cell corresponding to the frequency point corresponding to any measurement priority in the measurement record. The details will be introduced in subsequent embodiments, and will not be repeated here.

Exemplarily, the frequency points with the measurement priority of 1 introduced in combination with FIG. 3 can be used as the frequency point corresponding to the target measurement priority in the measurement record, including frequency points f9 and f7.

405. The terminal device measures cell information under the frequency point corresponding to the priority to which the specific frequency point belongs.

During implementation of the above embodiment, by means of storing the measurement record of the previous cell measurement, the measurement record includes the serving cells of the terminal device, the frequency points corresponding to the multiple priorities set according to the signal strength, and the correspondence relationships between the frequency points and the cells. Later, when the cell measurement condition (the measurement configuration information sent by the network device is received or it is detected that the measurement cycle is satisfied) is satisfied, if the current serving cell of the terminal device matches a serving cell in the stored measurement record, only the cell information of the frequency point with the highest measurement priority in the measurement record needs to be measured, and the cell information under the frequency points corresponding to other priorities is not required to be measured. When the cell measurement condition (the measurement configuration information sent by the network device is received or it is detected that the measurement cycle is satisfied) is satisfied and the current serving cell of the terminal device does not match a serving cell in the measurement record, if the current serving cell of the terminal device is a cell corresponding to the frequency point corresponding to the highest measurement priority in the measurement record, only the cell information of the frequency point with the highest measurement priority in the measurement record needs to be measured similarly, and the cell information under the frequency points corresponding to other priorities is not required to be measured. However, if the current serving cell of the terminal device is a cell corresponding to a specific frequency point, only the cell information under the frequency point corresponding to the measurement priority to which the specific frequency point belongs is measured. The specific frequency point is the frequency point corresponding to the target measurement priority in the measurement record, and the target measurement priority is not the highest measurement priority in the measurement record. It can be seen that according to changes of serving cells, the terminal device can optimize the cell measurement, decrease the number of measurement frequency points, shorten the measurement time, reduce the power consumption of the terminal device, and improve the system performance. Furthermore, since the measurement frequency points can be intelligently selected according to the changes of the serving cells, the present application comprehensively considers moving scenario of the terminal device and is applicable to mobility management of protocols.

Figure 5:
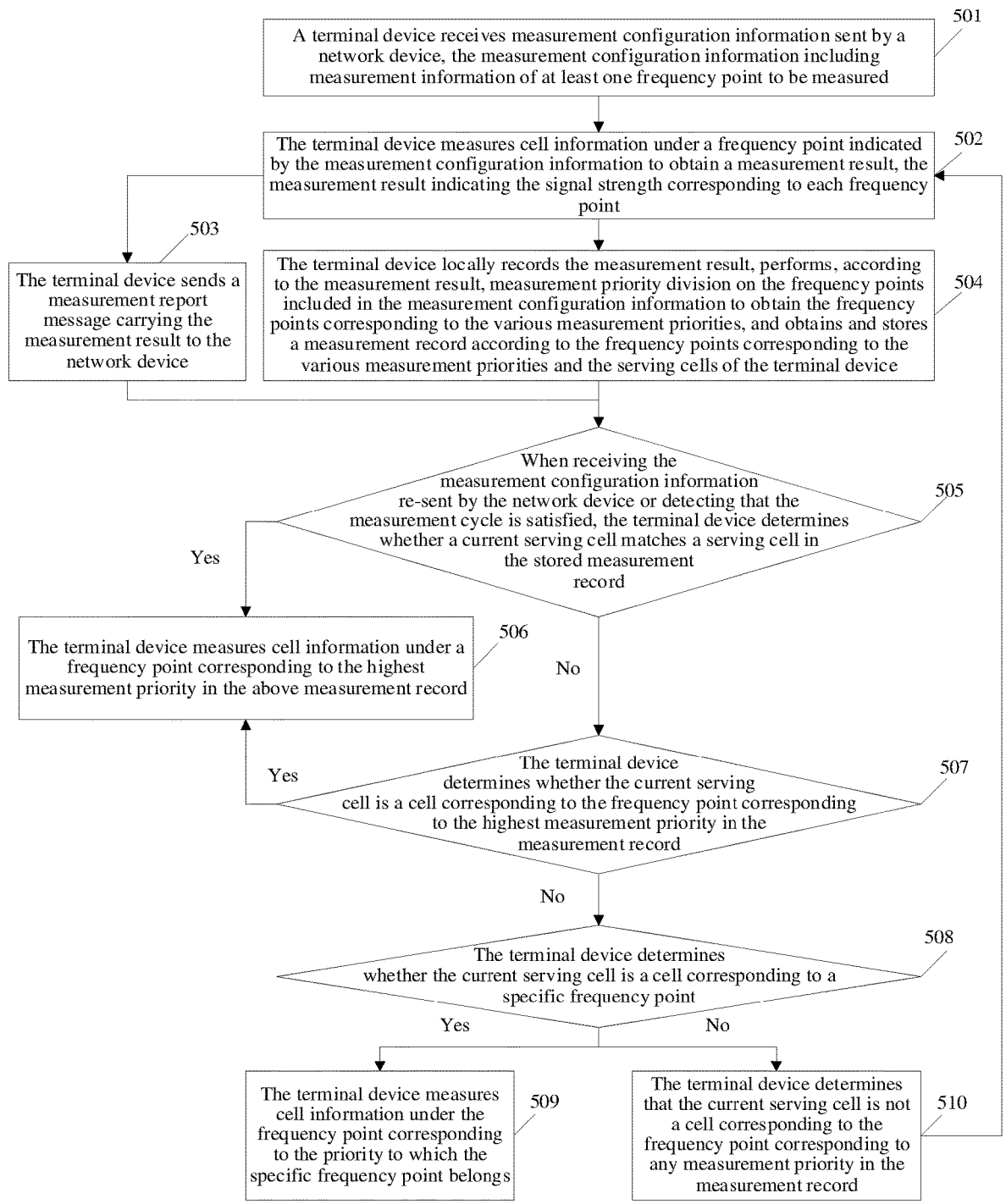
FIG. 5 is a schematic diagram of another embodiment of a cell measurement method based on frequency point optimization of the present application.

As shown in FIG. 5, a schematic diagram of another embodiment of a cell measurement method based on frequency point optimization of the present application is illustrated. The cell measurement method may include:

501. A terminal device receives measurement configuration information sent by a network device. The measurement configuration information includes measurement information of at least one frequency point to be measured.

It should be noted that in step 501, after receiving the measurement configuration information, the terminal device does not detect a measurement record (which may mean that a stored measurement record is not detected locally). Specifically, it can be considered that step 501 is as follows: The terminal device receives the measurement configuration information sent by the network device, but does not detect the measurement record.

Optionally, if the terminal device receives the measurement configuration information, but does not detect the measurement record, it can be considered that the measurement configuration information is a first piece of measurement configuration information received by the terminal device. Of course, the measurement configuration information received during network searching after the terminal device is started for use for the first time and uses can be regarded as the "first measurement configuration information", or the measurement configuration information received during network researching after the terminal device is reset can be regarded as the "first measurement configuration information", which is not limited here.

502. The terminal device measures cell information under a frequency point indicated by the measurement configuration information to obtain a measurement result. The measurement result indicates the signal strength corresponding to each frequency point.

The signal strength corresponding to each frequency point is the signal strength of a corresponding cell.

Specifically, step 502 may include: the terminal device performs cell measurement on the frequency point according to the measurement information of the frequency point in the measurement configuration information to obtain a measurement result.

After step 502 has been executed, step 503 and step 504 can be executed at the same time, or step 503 can be executed before step 504, or step 504 can be executed before step 503.

503. The terminal device sends a measurement report message carrying the measurement result to the network device.

The terminal device feeds back the measurement result to the network device, so that the network device can select a serving cell for accessing for the terminal device according to the measurement result.

504. The terminal device locally records the measurement result, performs, according to the measurement result, measurement priority division on the frequency points included in the measurement configuration information to obtain the frequency points corresponding to the various measurement priorities, and obtains and stores a measurement record according to the frequency points corresponding to the various measurement priorities and the serving cells of the terminal device.

The terminal device can locally record the measurement results of frequency points, and divide the frequency points to different measurement priorities according to the measured signal strength and the RSRQ.

Exemplarily, FIG. 3 is taken as an example. The signal strengths of frequency points f5, f8 and f6 are strong, and their measurement priorities can be set to 0. The signal strengths of frequency points f9 and f7 are weak, and their measurement priorities are set to 1. It can also be understood that a larger value of a measurement priority indicates a lower measurement priority. Of course, it can also be set in reverse, which can be specifically set freely by a user, and will not be limited by the present application.

505. When receiving the measurement configuration information re-sent by the network device or detecting that the measurement cycle is satisfied, the terminal device determines whether a current serving cell matches a serving cell in the stored measurement record.

If the current serving cell matches a serving cell in the measurement record, step 506 is executed. If the current serving cell does not match a serving cell in the measurement record, step 507 is executed.

After receiving the measurement configuration information re-sent by the network device or the measurement cycle is satisfied, the terminal device first determines whether a serving cell of the terminal device changes (that is, whether the current serving cell matches the serving cell in the stored measurement record). If the serving cell does not change, the terminal device measures the frequency points with the highest measurement priority, including frequencies f5, f8, and f6 with the measurement priority of 0 in FIG. 3.

506. The terminal device measures cell information under a frequency point corresponding to the highest measurement priority in the above measurement record.

507. The terminal device determines whether the current serving cell is a cell corresponding to the frequency point corresponding to the highest measurement priority in the measurement record.

If yes, step 506 is carried out. If no, step 508 is carried out.

If the current serving cell does not match a serving cell in the measurement record, the terminal device first determines whether the current serving cell of the terminal device is changed into a cell under a frequency point with the highest measurement priority. If yes, only cell information under the frequency point with the highest measurement priority is measured.

508. The terminal device determines whether the current serving cell is a cell corresponding to a specific frequency point. The specific frequency point is a frequency point corresponding to a target measurement priority in the above measurement record, and the target measurement priority is not the highest measurement priority in the above measurement record.

If a determination result is yes, step 509 is executed. If a determination result is no, step 510 is executed.

Exemplarily, the frequency with the measurement priority of 1 introduced in FIG. 3 can be used as the frequency point corresponding to the target measurement priority in the measurement record.

509. The terminal device measures cell information under the frequency point corresponding to the priority to which the specific frequency point belongs.

Exemplarily, if the current serving cell is changed into the cell under the frequency point with the measurement priority of 1, the terminal device measures frequency points f7 and f9 with the measurement priority of 1.

510. The terminal device determines that the current serving cell is not the cell corresponding to the frequency point corresponding to any measurement priority in the measurement record, and proceeds to step 502.

Exemplarily, if the current serving cell does not belong to cells under frequency points f5, f6, f7, f8, and f9, step 502 is executed.

By implementing the above embodiment, according to changes of serving cells, the terminal device can optimize the cell measurement, decrease the number of measurement frequency points, shorten the measurement time, reduce the power consumption of the terminal device, and improve the system performance. Furthermore, since the measurement frequency points can be intelligently selected according to the changes of the serving cells, the present application comprehensively considers moving scenario of the terminal device and is applicable to mobility management of protocols.

Figure 6:
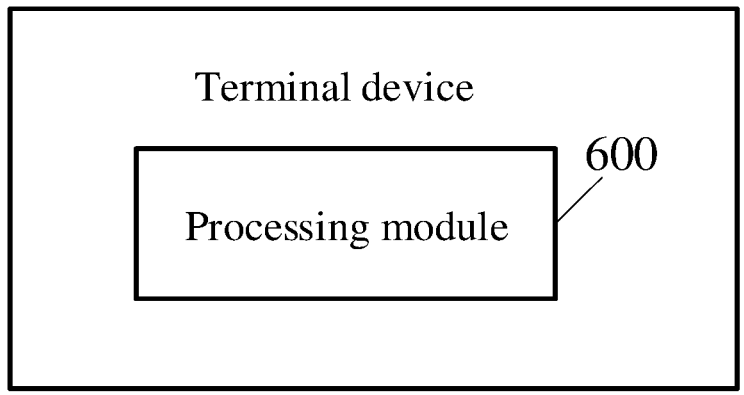
FIG. 6 is a schematic structural diagram of a terminal device provided in an embodiment of the present application.

Referring to FIG. 6, FIG. 6 is a schematic structural diagram of a terminal device provided in an embodiment of the present application. The terminal device may include:

a processing module 600, configured to: when a cell measurement condition is satisfied, if a current serving cell of the terminal device matches a serving cell in a stored measurement record, measure cell information of a frequency point corresponding to the highest measurement priority in the measurement record, wherein the measurement record includes serving cells of the terminal device, and frequency points respectively corresponding to multiple measurement priorities set according to the signal strength, and the cell measurement condition includes receiving measurement configuration information sent by a network device or detecting that a measurement cycle is satisfied.

The above processing module 600 is further configured to: when the cell measurement condition is satisfied and the current serving cell of the terminal device does not match a serving cell in the measurement record, if the current serving cell of the terminal device is a cell corresponding to the frequency point corresponding to the highest measurement priority in the measurement record, measure cell information of the frequency point corresponding to the highest measurement priority in the measurement record.

The above processing module 600 is further configured to: when the cell measurement condition is satisfied and the current serving cell of the terminal device does not match a serving cell in the measurement record, if the current serving cell of the terminal device is a cell corresponding to a specific frequency point, measure cell information under a frequency point corresponding to a measurement priority to which the specific frequency point belongs, wherein the specific frequency point is a frequency point corresponding to a target measurement priority in the measurement record, and the target measurement priority is not the highest measurement priority in the measurement record.

By implementing the above terminal device, according to changes of serving cells, the present application can optimize the cell measurement, decrease the number of measurement frequency points, shorten the measurement time, reduce the power consumption of the terminal device, and improve the system performance. Furthermore, since the measurement frequency points can be intelligently selected according to the changes of the serving cells, the present application comprehensively considers moving scenario of the terminal device and is applicable to mobility management of protocols.

Optionally, in some implementations of the present application, the above processing module 600 is further configured to: if the measurement configuration information sent by the network device is received, but the measurement record is not detected, measure cell information under a frequency point indicated by the measurement configuration information to obtain a measurement result which indicates the signal strength corresponding to each frequency point, so as to perform, according to the measurement result, measurement priority division on the frequency points included in the measurement configuration information to obtain the frequency points corresponding to the various measurement priorities, and obtain and store a measurement record according to the frequency points corresponding to the various measurement priorities and the serving cells of the terminal device.

Optionally, in some implementations of the present application, when the cell measurement condition is receiving the measurement configuration information sent by the network device, if the current serving cell of the terminal device does not match a serving cell in the measurement record, and the current serving cell of the terminal device is not a cell corresponding to the frequency point corresponding to any measurement priority in the measurement record, the above processing module 600 is triggered to execute the step of measuring cell information under a frequency point indicated by the measurement configuration information to obtain a measurement result.

Optionally, in some implementations of the present application, the terminal device further includes a communication module, configured to send a measurement report message carrying the measurement result to the network device.

An embodiment of the present application further provides a terminal device, which may include:
a memory which stores executable program codes; and
a processor coupled to the memory.

The processor invokes the executable program codes stored in the memory to implement the cell measurement methods based on frequency point optimization, which are executed by the terminal device, in the above various method embodiments.

Figure 7:
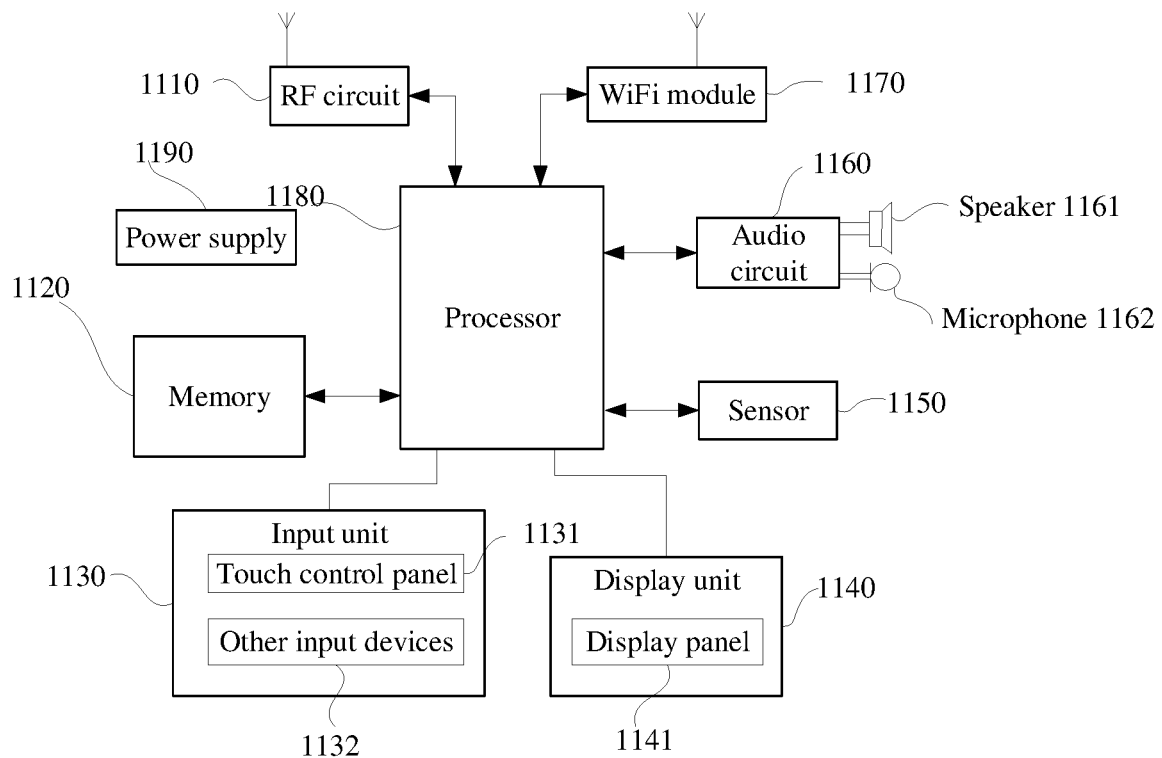
FIG. 7 is a schematic structural diagram of a mobile phone provided by an embodiment of the present application.

The terminal device in this embodiment of the present application may be a mobile phone as shown in FIG. 7. The mobile phone may include: a radio frequency (RF) circuit 1110, a memory 1120, an input unit 1130, a display unit 1140, a sensor 1150, an audio circuit 1160, a wireless fidelity (WiFi) module 1170, a processor 1180, a power supply 1190, and the like. The RF circuit 1110 includes a receiver 1111 and a transmitter 1112. Those skilled in the art can understand that the structure of the mobile phone shown in FIG. 7 does not constitute a limitation to the mobile phone, and may include more or fewer components than those shown in the figure, or combine some components, or arrange different components.

The RF circuit 1110 may be configured to receive and transmit signals in an information transmitting and receiving process or a communication process. Particularly, downlink information of a base station is provided to the processor 1180 for processing after being received. In addition, it will be designed that uplink data are transmitted to the base station. Generally, the RF circuit 1110 includes, but is not limited to, an antenna, at least one amplifier, a transceiver, a coupler, a Low Noise Amplifier (LNA), a duplexer, and the like. In addition, the RF circuit 1110 may also communicate with a network and other devices by means of wireless communication. The above wireless communication may use any communication standard or protocol, including, but not limited to, Global System of Mobile communication (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 1120 may be configured to store software and modules. The processor 1180 runs the software and modules stored in the memory 1120 to execute various functional applications and data processing of the mobile phone. The memory 1120 may mainly include a storage program region and a storage data region. The storage program region may store an operating system, at least one function required application program (such as a sound playback function and an image playback function), and the like. The storage data region may store data (such as audio data and a phone book) created according to the use of mobile phone. In addition, the memory 1120 may include a high-speed random access memory, and may further include a non-volatile memory, such as at least one magnetic disk storage device, a flash memory device, or other volatile solid-state storage devices.

The input unit 1130 may be configured to receive input numeric or character information, and generate key signal inputs related to user settings and function control of the mobile phone. Specifically, the input unit 1130 may include a touch control panel 1131 and other input devices 1132. The touch control panel 1131, also referred to as a touch screen, may collect user's touch operations on or near it (for example, the user uses a finger, a stylus or any suitable object or accessory to perform operations on or near the touch control panel 1131), and drive a corresponding connection apparatus according to a preset program. Optionally, the touch control panel 1131 may include two parts: a touch detection apparatus and a touch controller. The touch detection apparatus detects a touch orientation of a user, detects a signal brought by the touch operation, and transmits the signal to the touch controller. The touch controller receives touch information from the touch detection apparatus, converts it into contact coordinates, and sends the contact coordinates to the processor 1180, and may receive and execute commands sent by the processor 1180. In addition, the touch control panel 1131 may be implemented by using various types such as a resistive type, a capacitive type, an infrared type, and a surface acoustic wave. In addition to the touch control panel 1131, the input unit 1130 may further include other input devices 1132. Specifically, the other input devices 1132 may include, but are not limited to, one or more of a physical keyboard, function keys (such as volume control keys and a switch key), a trackball, a mouse, an operation lever, and the like.

The display unit 1140 may be configured to display information input by the user or information provided to the user and various menus of the mobile phone. The display unit 1140 may include a display panel 1141, which may be, optionally, configured in the form of a Liquid Crystal Display (LCD), an Organic Light-Emitting Diode (OLED), and the like. Further, the touch control panel 1131 may cover the display panel 1141. When the touch control panel 1131 detects the touch operation on or near it, the touch control panel 1131 transmits the touch operation to the processor 1180 to determine the type of a touch event. Then, the processor 1180 provides a corresponding vision output on the display panel 1141 according to the type of the touch event. Although, in FIG. 7, the touch control panel 1131 and the display panel 1141 are two separate components to realize the input and input functions of the mobile phone, in some embodiments, the touch control panel 1131 and the display panel 1141 may be integrated to realize the input and output functions of mobile phones.

The mobile phone may further include at least one sensor 1150, such as a light sensor, a motion sensor, and other sensors. Specifically, the light sensor may include an ambient light sensor and a proximity sensor. The ambient light sensor may adjust the brightness of the display panel 1141 according to the brightness of ambient light. The proximity sensor may shut down the display panel 1141 and/or the backlight when the mobile phone is moved to an ear. As one kind of the motion sensor, an accelerometer sensor may detect accelerations in various directions (usually triaxial), and may detect the magnitude and direction of the gravity when it is stationary. This sensor may be configured to identify applications of mobile phone attitudes (such as horizontal and vertical screen switching, related games, magnetometer attitude calibration), vibration recognition related functions (such as a pedometer, tap), and the like. The mobile phone may also be equipped with a gyroscope, a barometer, a hygrometer, a thermometer, an infrared sensor and other sensors, and descriptions thereof are omitted here.

The audio circuit 1160, a speaker 1161 and a microphone 1162 may provide an audio interface between the user and the mobile phone. The audio circuit 1160 may convert received audio data into an electrical signal and transmit the signal to the speaker 1161, and the electrical signal is converted into a sound signal by the speaker 1161 and then output. On the other hand, the microphone 1162 converts the collected sound signal into an electrical signal, and the audio circuit 1160 converts the electrical signal into the audio data after receiving the electrical signal, and then the audio data is output to the processor 1180 for processing and sent to, such as, another mobile phone through the RF circuit 1110, or the audio data is output to the memory 1120 for further processing.

WiFi is a short-range wireless transmission technology. The mobile phone may help the user send and receive emails, browse web pages and access streaming media through the WiFi module 1170, and provides the user with wireless broadband Internet accesses. Although FIG. 7 shows the WiFi module 1170, it can be understood that this module does not belong to necessary configuration of the mobile phone, and may be omitted as needed without changing the essence of the present application.

The processor 1180 is a control center of the mobile phone, and uses various interfaces and lines to connect the various parts of the entire mobile phone. The software and/or modules stored in the memory 1120 are run or executed, and the data stored in the memory 1120 is invoked, so as to execute various functions of the mobile phone and process the data, thus monitoring the entire mobile phone. Optionally, the processor 1180 may include one or more processing units. Optionally, the processor 1180 may integrate an application processor and a modem processor. The application processor mainly processes an operating system, a user interface, an application program and the like, and the modem processor mainly deals with wireless communication. It can be understood that the foregoing modem processor may not be integrated into the processor 1180, either.

The mobile phone further includes a power supply 1190 (such as a cell) for supplying power to the various components. Preferably, the power supply may be logically connected to the processor 1180 through a power management system, thereby realizing functions of managing charging, discharging and power management and the like through the power management system. Although not shown, the mobile phone may further include a camera, a Bluetooth module, and the like, and descriptions thereof are omitted here.

In some implementations, the above circuit 1110 may receive measurement configuration information sent by a network device.

An embodiment of the present application further discloses a computer-readable storage medium, which stores a computer program. The computer program causes a computer to implement the cell measurement method based on frequency point optimization disclosed in FIG. 4 to FIG. 5.

An embodiment of the present application further discloses a computer program product which, when run on a computer, causes the computer to execute part or all of the steps of any one of the methods disclosed in FIG. 4 to FIG. 5.

An embodiment of the present application further discloses an application posting platform. The application posting platform is configured to post a computer program product which, when run on a computer, causes the computer to execute part or all of the steps of any one of the methods disclosed in FIG. 4 to FIG. 5.

The embodiment of the present application discloses a cell measurement method based on frequency point optimization and a terminal device for detailed introduction. the present application uses specific example to the principle and implementation manner of the present application, the explanation of the embodiment is only used for helping understand the method and the core idea of the present application; At the same time, for the general technical personnel of the field, according to the idea of the present application, the specific implementation manner and application range will be changed, in summary, the specification content should not be understood as the limit of the present application

What is claimed is:

1. A cell measurement method based on frequency point optimization, the method comprising:
when a cell measurement condition is satisfied and a current serving cell of a terminal device matches a serving cell in a stored measurement record, measuring cell information of a frequency point corresponding to the highest measurement priority in the stored measurement record, wherein the stored measurement record is obtained from measurement results obtained by the terminal device measuring, during last cell measurement, all frequency points in a network device according to measurement configuration information sent by the network device, and the stored measurement record comprises serving cells of the terminal device, and frequency points respectively corresponding to multiple measurement priorities set according to the signal strength, and the cell measurement condition comprises receiving measurement configuration information sent by the network device or detecting that a measurement cycle is satisfied;
when the cell measurement condition is satisfied and the current serving cell of the terminal device does not match a serving cell in the stored measurement record, if the current serving cell of the terminal device is a cell corresponding to the frequency point corresponding to the highest measurement priority in the stored measurement record, measuring cell information of the frequency point corresponding to the highest measurement priority in the stored measurement record;

when the cell measurement condition is satisfied and the current serving cell of the terminal device does not match a serving cell in the stored measurement record, if the current serving cell of the terminal device is a cell corresponding to a specific frequency point, measuring cell information under a frequency point corresponding to a measurement priority to which the specific frequency point belongs, wherein the specific frequency point is a frequency point corresponding to a target measurement priority in the stored measurement record, and the target measurement priority is not the highest measurement priority in the stored measurement record;

when the cell measurement condition is satisfied, but the current serving cell of the terminal device is not a cell corresponding to the frequency points corresponding to any measurement priority, measuring cell information under a frequency point indicated by the measurement configuration information to obtain a measurement result which indicates the signal strength corresponding to each frequency point, so as to perform, according to the measurement result, measurement priority division on the frequency points comprised in the measurement configuration information to obtain the frequency points corresponding to the various measurement priorities, and obtain and store a measurement record according to the frequency points corresponding to the various measurement priorities and the serving cells of the terminal device; and the method further comprising:

if the measurement configuration information sent by the network device is received, but the stored measurement record is not detected, executing the step of measuring cell information of a frequency point indicated by the measurement configuration information to obtain a measurement result.

2. The method according to claim 1, further comprising: when the cell measurement condition is receiving the measurement configuration information sent by the network device, if the current serving cell of the terminal device does not match a serving cell in the stored measurement record, and the current serving cell of the terminal device is not a cell corresponding to the frequency point corresponding to any measurement priority in the stored measurement record, executing the step of measuring cell information under a frequency point indicated by the measurement configuration information to obtain a measurement result.

3. The method according to claim 2, wherein after the measuring cell information under a frequency point indicated by the measurement configuration information to obtain a measurement result, the method further comprises:

sending a measurement report message carrying the measurement result to the network device.

4. The method according to claim 1, wherein the signal strength comprises at least one of the following: Reference Signal Receiving Power (RSRP), Reference Signal Receiving Quality (RSRQ), Signal to Interference plus Noise Ratio (SINR), and Received Signal Strength Indicator (RSSI).

5. A terminal device, the terminal device comprising:

a processing module, configured to: when a cell measurement condition is satisfied, and a current serving cell of the terminal device matches a serving cell in a stored measurement record, measure cell information of a frequency point corresponding to the highest measurement priority in the stored measurement record, wherein the stored measurement record is obtained from measurement results obtained by the terminal device measuring, during last cell measurement, all frequency points in a network device according to measurement configuration information sent by the network device, and the stored measurement record comprises serving cells of the terminal device, and frequency points respectively corresponding to multiple measurement priorities set according to the signal strength, and the cell measurement condition comprises receiving measurement configuration information sent by the network device or detecting that a measurement cycle is satisfied; wherein the processing module is further configured to: when the cell measurement condition is satisfied and the current serving cell of the terminal device does not match a serving cell in the stored measurement record, if the current serving cell of the terminal device is a cell corresponding to the frequency point corresponding to the highest measurement priority in the stored measurement record, measure cell information of the frequency point corresponding to the highest measurement priority in the stored measurement record;

the processing module is further configured to: when the cell measurement condition is satisfied and the current serving cell of the terminal device does not match a serving cell in the stored measurement record, if the current serving cell of the terminal device is a cell corresponding to a specific frequency point, measure cell information under a frequency point corresponding to a measurement priority to which the specific frequency point belongs, wherein the specific frequency point is a frequency point corresponding to a target measurement priority in the stored measurement record, and the target measurement priority is not the highest measurement priority in the stored measurement record;

the processing module is further configured to: when the cell measurement condition is satisfied, but the current serving cell of the terminal device is not a cell corresponding to the frequency points corresponding to any measurement priority, measure cell information under a frequency point indicated by the measurement configuration information to obtain a measurement result which indicates the signal strength corresponding to each frequency point, so as to perform, according to the measurement result, measurement priority division on the frequency points comprised in the measurement configuration information to obtain the frequency points corresponding to the various measurement priorities, and obtain and store a measurement record according to the frequency points corresponding to the various measurement priorities and the serving cells of the terminal device; and the processing module is further configured to: if the measurement configuration information sent by the network device is received, but the stored measurement record is not detected, execute the step of measuring cell information of a frequency point indicated by the measurement configuration information to obtain a measurement result.

6. The terminal device according to claim 5, wherein
when the cell measurement condition is receiving the measurement configuration information sent by the network device, if the current serving cell of the terminal device does not match a serving cell in the stored measurement record, and the current serving cell of the terminal device is not a cell corresponding to the frequency point corresponding to any measurement priority in the stored measurement record, the processing module is triggered to execute the step of measuring cell information under a frequency point indicated by the measurement configuration information to obtain a measurement result.

7. A terminal device, comprising:
a memory which stores executable program codes; and
a processor coupled to the memory,
wherein the processor invokes the executable program codes stored in the memory to implement the cell measurement method based on frequency point optimization according to claim 1.

8. A non-transitory computer-readable storage medium, comprising instructions which, when run on a computer, causes the computer to implement the method according to claim 1.

* * * * *